United States Patent [19]
Cern

[11] Patent Number: 5,815,298
[45] Date of Patent: Sep. 29, 1998

[54] SYSTEM AND METHOD FOR WIRELESSLY COMMUNICATING A SOUND SIGNAL

[75] Inventor: Yehuda Cern, Efrat, Israel

[73] Assignee: Jolt Ltd., Jersusalem, Israel

[21] Appl. No.: 684,905

[22] Filed: Jul. 25, 1996

[30] Foreign Application Priority Data

Jul. 25, 1995 [IL] Israel ........................................ 114727

[51] Int. Cl.⁶ .................................................. H04B 10/00
[52] U.S. Cl. ........................ 359/152; 359/159; 359/172; 359/110; 455/151.2; 379/56; 375/238; 370/241; 370/277; 340/825.72; 381/111; 381/172
[58] Field of Search .................................. 359/110, 143, 359/149, 152, 159, 162, 172, 184; 455/151.2; 379/56; 381/111, 172; 375/224, 238, 219; 370/241, 277

[56] References Cited

U.S. PATENT DOCUMENTS

| | | | |
|---|---|---|---|
| 4,524,335 | 6/1985 | Yokoyama | 375/238 |
| 5,282,224 | 1/1994 | Harada | 370/241 |
| 5,367,394 | 11/1994 | Chuter et al. | 359/110 |
| 5,495,357 | 2/1996 | Osterhout | 359/152 |
| 5,506,709 | 4/1996 | Segal et al. | 359/110 |

*Primary Examiner*—Kinfe-Michael Negash
*Attorney, Agent, or Firm*—Scully, Scott Murphy and Presser

[57] ABSTRACT

A system for communicating a signal representing the amplitude of a sound signal received at a remotely located transceiver via an optical airlink communication network, the system having an optical transceiver, including an optical receiver and an optical ON/OFF keyed transmitter; a detector coupled to the optical receiver for providing a DC voltage signal output which is substantially proportional to the amplitude of the signal received at the optical receiver; a voltage controlled audio oscillator coupled to the detector for providing an audio output signal of a frequency proportional to the DC voltage signal provided by the detector; a test signal generator for generating a carrier test signal; and a pulse width modulator coupled to the test signal generator, to the voltage controlled audio oscillator, and to the optical transmitter, wherein the pulse width modulator modulates the audio output signal over the carrier test signal to control generation of ON/OFF keyed optical signals by the optical transmitter. A method for communicating a sound signal via an optical airlink communication network is also provided.

18 Claims, 2 Drawing Sheets

SYSTEM AND METHOD FOR WIRELESSLY COMMUNICATING A SOUND SIGNAL

FIELD OF THE INVENTION

The present invention generally relates to wireless communication systems, and more particularly to optical wireless communication systems.

BACKGROUND OF THE INVENTION

Optical wireless communication systems generally include two pairs of transmitter-receivers, also referred to in combination as transceivers. Each transceiver is placed apart from the other, so that a line of sight (LOS) is established between them.

During installation of the transceivers, or during maintenance operations, an alignment process is performed in which each transmitter is aimed precisely along the LOS. In the alignment process, a first technician stationed at a first transceiver communicates with a second technician stationed at a second transceiver remote from the first transceiver. Typically, one of the technicians (referred to herein as an "aimer") aligns the system by controllably moving the transceiver in response to commands received from the second technician via a telephone or radio communication system. The exact time of achieving alignment, and thus, the accuracy of the alignment, depend on the ability of the second technician to observe a readout of the signal strength level and to instantly convey this information orally to the aimer. Any delays in communicating the signal strength level will cause the aimer to overshoot the peak, and will thus prolong the alignment process. Furthermore, since aiming angle adjustments are sensitive and are performed over both azimuth and elevation, many iterations may be required to achieve an acceptable accuracy.

SUMMARY OF THE INVENTION

The invention provides a system for communicating a signal representing the amplitude of a sound signal received at a remotely located transceiver, via an optical airlink communication network, said system comprising an optical transceiver, including an optical receiver and an optical ON/OFF keyed transmitter; a detector coupled to said optical receiver for providing a DC voltage signal output which is substantially proportional to the amplitude of the signal received at said optical receiver; a voltage controlled audio oscillator coupled to said detector for providing an audio output signal of a frequency proportional to the DC voltage signal provided by said detector; a test signal generator for generating a carrier test signal; and a pulse width modulator coupled to said test signal generator, to said voltage controlled audio oscillator, and to said optical transmitter, wherein said pulse width modulator modulates said audio output signal over said carrier test signal to control generation of ON/OFF keyed optical signals by said optical transmitter.

The invention further provides a system for communicating voice over an optical airlink communication network, said system comprising a microphone for generating an electrical audio signal representative of speech; an audio voltage amplifier coupled to said microphone, for amplifying said audio signal; a test signal generator for generating a carrier test signal; an optical transceiver including an optical receiver and an optical ON/OFF keyed transmitter; and a pulse width modulator coupled to said test signal generator, to said audio voltage amplifier, and to said optical transmitter, wherein said pulse width modulator modulates said amplified audio signal over said carrier test signal, to control generation of ON/OFF keyed optical signals by said optical transmitter.

In another aspect of the present invention, there is provided a multi-mode communication system for providing data communications and audio feedback communications, said system comprising a selector for selecting a mode of operation; a switching unit coupled to said selector for switching to said selected mode of operation; a mode signalling oscillator for providing a signal uniquely associated with the selection of said mode of operation; an optical transceiver including an optical receiver and an optical ON/OFF keyed transmitter; a test signal generator for generating a carrier test signal; and a pulse width modulator coupled to said test signal generator, to said switching unit, and to said optical transmitter, for modulating said signal associated with the selection of said mode of operation over said carrier test signal, to control generation of ON/OFF keyed optical signals by said optical transmitter.

Said system further includes an optical transceiver, including an optical receiver and an optical ON/OFF keyed transmitter; a detector coupled to said optical receiver for providing a DC voltage signal output which is substantially proportional to the amplitude of the signal received at said optical receiver; a voltage controlled audio oscillator coupled to said detector for providing an audio output signal of a frequency proportional to the DC voltage signal provided by said detector; a lowpass filter coupled to said detector for separating a received audio signal from a carrier signal and for eliminating said carrier signal; an audio amplifier coupled to said lowpass filter for amplifying said received audio signal; a loudspeaker coupled to said audio amplifier, for producing a speech signal in accordance with the amplified received audio signal; a selector for selecting a mode of operation; a mode signalling detector coupled to said detector, for providing a signal indicating the selected mode of operation; a mode signalling oscillator for providing a signal associated with said signal indicating the selected mode of operation; a microphone for generating an audio signal representative of speech; an audio voltage amplifier coupled to said microphone, for amplifying said audio signal; a switching unit coupled to said mode signalling detector, to said voltage controlled audio oscillator, to said mode signalling oscillator, to said selector and to said audio voltage amplifier, for switching between available modes of operation; a test signal generator for generating a carrier test signal; and a pulse width modulator coupled to said test signal generator, to said switching unit, and to said optical transmitter, wherein said pulse width modulator modulates the pulse width of said signal provided via said switching unit in accordance with said selected mode of operation, over said carrier test signal, to control generation of ON/OFF keyed optical signals by said optical transmitter.

In another aspect of the present invention, there is provided a method for communicating a sound signal via an optical airlink communication network, said method comprising locating an aiming station at which alignment operations are performed at a distance from a remote station, at a range which is acceptable for over-the-air optical communications; providing, at each of said stations, an optical transceiver including an optical receiver and an optical ON/OFF keyed transmitter; transmitting a test signal from said aiming station to said remote station; receiving said test signal at a receiver at said remote station; providing an audio frequency output signal in response to said received test signal; generating a carrier test signal at said remote station; modulating said audio frequency output signal in accordance with a pulse width modulation scheme over said carrier test signal, to control generation of ON/OFF keyed signals by the optical transmitter in said remote station; and transmitting said ON/OFF keyed optical signals.

A still further aspect of the present invention provides a method for communicating voice over an optical airlink communication network, said method comprising converting a speech signal to an electrical audio signal representative of said speech signal; amplifying said electrical audio signal to provide an amplified audio signal; generating a carrier test signal; providing an optical transceiver including an optical receiver and an optical ON/OFF keyed transmitter; modulating said amplified audio signal over said carrier test signal in accordance with a pulse width modulation scheme, to control generation of ON/OFF keyed signals by said optical transmitter; and transmitting said ON/OFF keyed optical signals.

Another further aspect of the present invention provides a method for providing data communications and audio feedback communications in a multi-mode communication system, said method comprising switching to a selected mode of operation; generating a signal indicative of the selection of said mode of operation; providing an optical transceiver including an optical receiver and an optical ON/OFF keyed transmitter; producing a carrier test signal; modulating said signal indicative of the selection of said mode of operation over said carrier test signal, to control generation of ON/OFF keyed optical signals by said optical transmitter; and transmitting said ON/OFF keyed signals.

BRIEF DESCRIPTION OF THE DRAWINGS

The invention will now be described in connection with certain preferred embodiments, with reference to the following illustrative figures so that it may be more fully understood.

With specific reference now to the figures in detail, it is stressed that the particulars shown are by way of example and for purposes of illustrative discussion of the preferred embodiments of the present invention only, and are presented in the cause of providing what is believed to be the most useful and readily understood description of the principles and conceptual aspects of the invention. In this regard, no attempt is made to show structural details of the invention in more detail than is necessary for a fundamental understanding of the invention, the description taken with the drawings making apparent to those skilled in the art how the several forms of the invention may be embodied in practice.

In the drawings:

FIG. 1 is a block diagram of an optical airlink communication system according to the present invention, and FIG. 2 is a block diagram of the system of FIG. 1, which forms part of an optical airlink communication unit, in accordance with a preferred embodiment of the present invention.

DETAILED DESCRIPTION OF PREFERRED EMBODIMENTS

Figure 1:
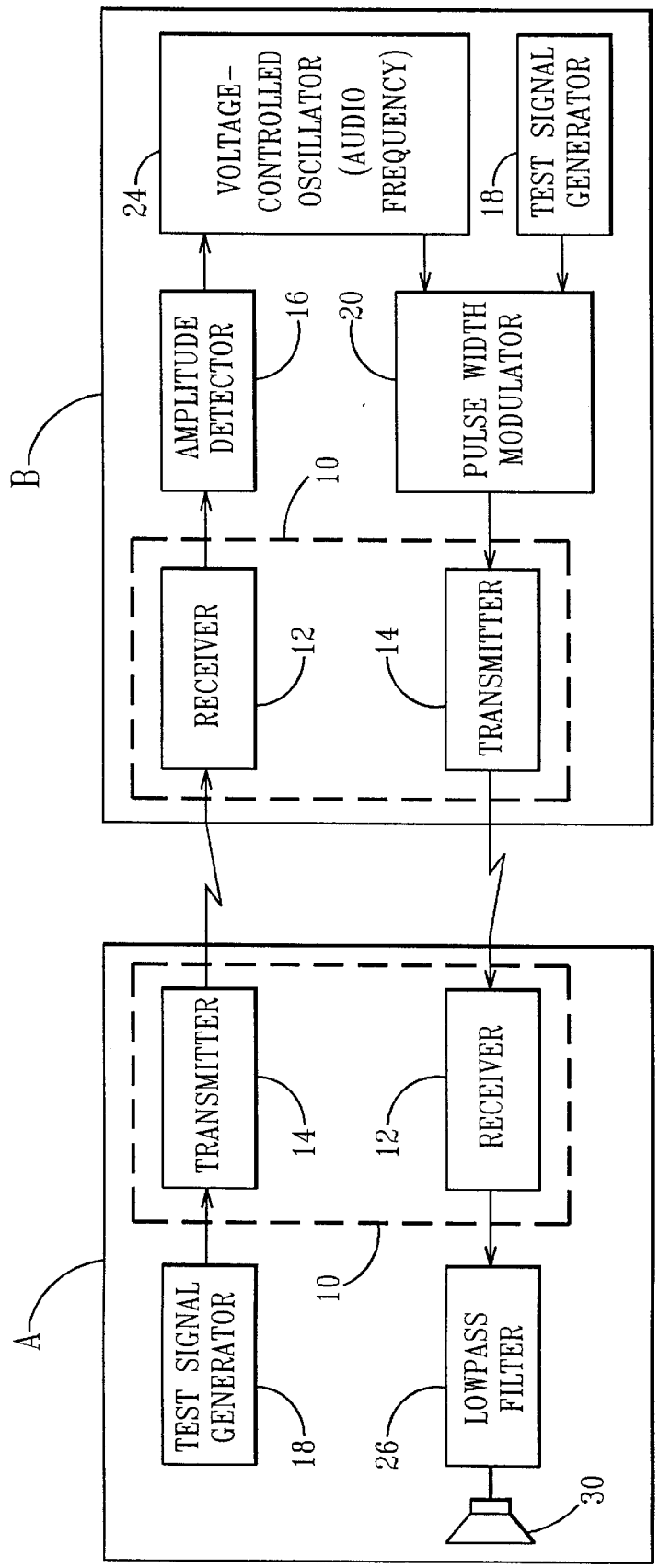

Reference is now made to FIG. 1, which is a block diagram of an optical airlink communication system, constructed and operative in accordance with a preferred embodiment of the present invention.

The optical airlink communication system may be employed in an optical airlink communication network, in which at least two communication stations A and B are placed apart from each other at a range which is acceptable for over-the-air optical communications. For purposes of description of the present invention, station A of said communication stations is referred to herein as an "aiming station" and the other, station B, is referred to as a "remote station."

In each of the communication stations, an optical transceiver 10 includes an optical receiver 12 and an optical ON/OFF keyed transmitter 14. Transmitter 14 of station A receives signals from a test signal generator 18 and transmits optical signals to a remote receiver 12 of Station B. The latter passes the received optical signals via a signal amplitude detector 16, e.g., a diode detector, to a voltage controlled oscillator 24. The signals are then applied to a pulse width modulator 20.

Transmitter 14 of station B is operable to generate optical signals and to transmit same over the air to the receiver 12 of station A. As seen in FIG. 1, transmitter 14 of station B is coupled to a test signal generator 18 via a pulse width modulator 20. Test signal generator 18 provides a test signal such as a 1 MHz square wave signal, which is pulse width modulated with the optical signals generated by transmitter 14.

The optical signals received by receiver 12 of station A are applied through a lowpass filter 26 to a loudspeaker 30.

Figure 2:
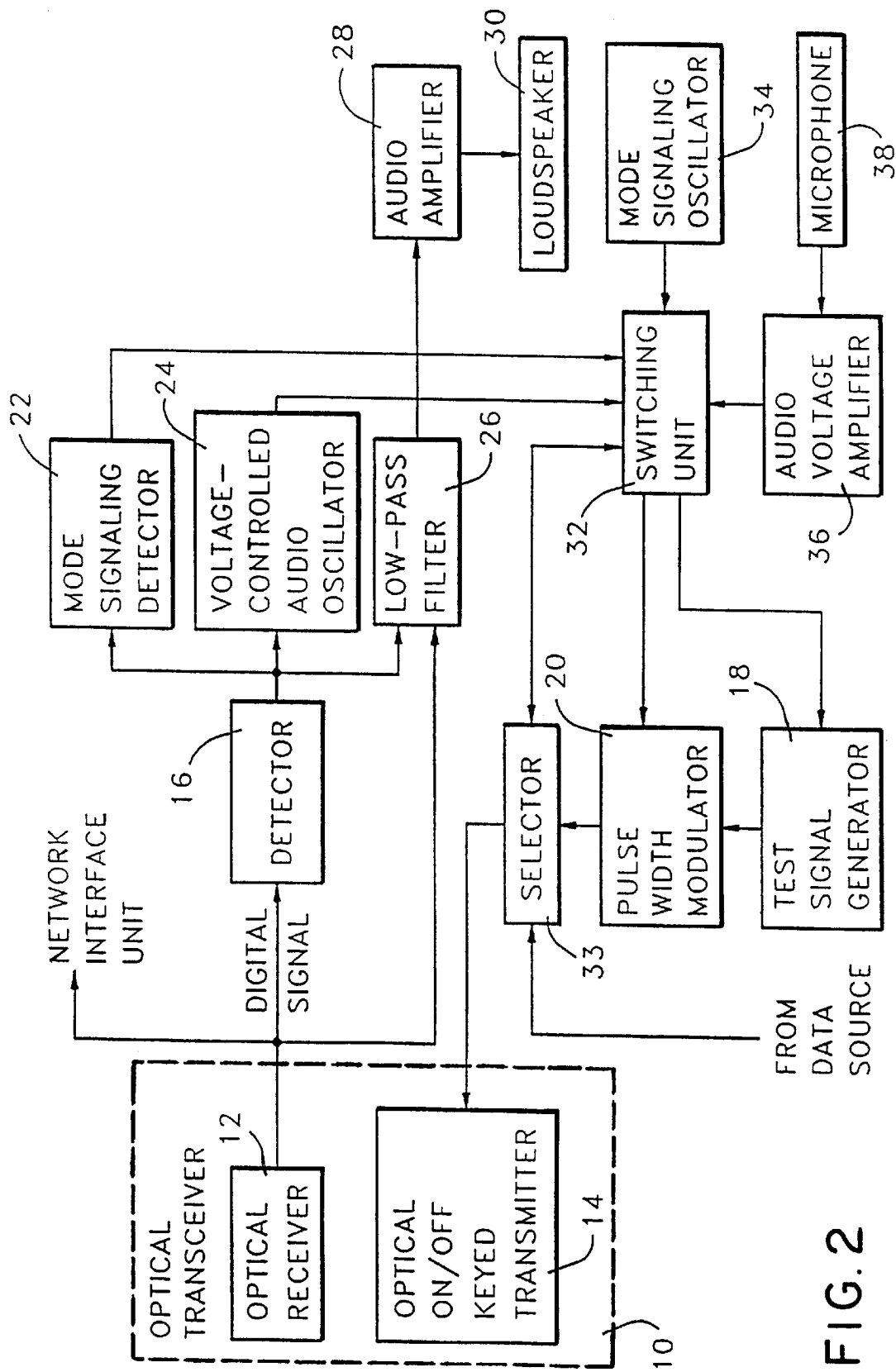

Referring now also to FIG. 2, it is seen that detector 16 is operable to provide, in parallel, digital signals to a mode signalling detector 22, to a voltage controlled audio oscillator 24, and to lowpass filter 26. It is to be appreciated that the lowpass filter 26 receives digital signals, representing audio, directly from optical receiver 12. Lowpass filter 26 is adapted to eliminate high frequency signals and to provide low frequency signals to an audio amplifier 28 which provides amplified audio signals to a loudspeaker 30.

Mode signalling detector 22 and voltage controlled audio oscillator 24 are coupled to a switching unit 32. In turn, switching unit 32 is coupled to test signal generator 18, to pulse width modulator 20, to a selector 33, to a mode signalling oscillator 34, and to an audio voltage amplifier 36. The latter is further coupled to a microphone 38. Selector 33 is coupled to transmitter 14 and is operable to enable selection of an operation mode, as will be described hereinafter.

The system of FIGS. 1 and 2 may be operable in several modes.

In an alignment mode, the aiming station may transmit a test signal, and the test signal strength, as received at the remote station, may be represented by an accoustic signal which is communicated back to the aiming station. Preferably, the accoustic signal is in the form of a tone signal. The test signal is transmitted by transmitter 14 of the aiming station and at least a portion of the signal is received at receiver 12 of the remote station. The signal received at the remote station is applied to detector 16. Detector 16 is a rectifying detector providing a DC voltage signal output that is substantially proportional to the amplitude of the received signal. The output signal of detector 16 is applied to voltage controlled audio oscillator 24, which outputs an audio output signal whose frequency is proportional to a voltage. Thus, the output signal of voltage controlled audio oscillator 24 is an audio signal whose frequency is proportional to the strength of a received test signal. If the received signal strength is zero, voltage controlled audio oscillator 24 provides a low base frequency. As the signal strength rises, the pitch of the audio tone increases proportionally. Voltage controlled audio oscillator 24 applies the audio signal to the pulse width modulator 20 via switching unit 32. Pulse width modulator 20 modulates the audio signal, in accordance with a pulse width modulation scheme, over a carrier test signal provided by test signal generator 18.

It is to be appreciated that voltage controlled audio oscillator 24 may be obviated to the effect that the audio tone signal is not generated. In that case, the output of detector 16 is applied to pulse width modulator 20 via switching unit 32. Pulse width modulator 20 modulates the signal and applies same to transmitter 14 for transmission over the air to the aiming station. The signal received at the aiming station does not include a voice component, but may be sensed by a DVM unit.

In a preferred embodiment of the present invention, the modulation is restricted to changes in duty cycle of the carrier test signal of no more than 5%, in order to avoid generation of pulses which are substantially shorter than a standard carrier signal pulse width and thus to limit frequency band width expansion to a value which is only slightly higher than the original band width of the signal.

The output pulse width modulated signal is used by transmitter 14 of the remote station to control generation of on/off keyed optical signals. Thus, at the end of this procedure, transmitter 14 of the remote station is operable to transmit to the aiming station signals carrying audio information in response to the test signal transmitted by the aiming station. Since the frequency of the audio signal is proportional to the strength of the signal received at the remote station, an audio signal with the highest frequency is generated when the aiming station and the remote station are aligned.

The optical signals carrying the audio signal which are transmitted by transmitter 14 of the remote station are received at receiver 12 of the aiming station. Receiver 12 of the aiming station provides the signals to lowpass filter 6, which filters the signals and separates audio signals from carrier signals. Lowpass filter 26 eliminates the carrier signal whose frequency is high, and applies the separated audio signal to audio amplifier 28, which amplifies the audio signal and applies same to loudspeaker 30. The latter, in turn, transduces the audio signal to a sound signal, preferably in the form of a voice tone signal having a frequency which indicates the strength of the signal received at the remote station. Thus, an indication of the signal strength received at the remote station is received at the aiming station via the optical communication airlink. Hence, an aimer positioned at the aiming station may align the system in accordance with the voice signal generated by the loudspeaker. The aimer may displace and rotate transceiver 10 of the aiming station until the highest frequency tone signal is received.

The test signal strength may also be used to indicate a fade margin, which is a factor employed to describe the excess of signal strength over path attenuation. In accordance with a preferred embodiment of the present invention, a readout signal is normalized to a receiver threshold level, which is typically a constant value supplied by the manufacturer of the receiver. By normalizing the readout to the receiver threshold level, a technician may interpret the readout as the fade margin at installation time, which typically takes place in clear weather, without performing additional calculations.

If the readout is linear, a simple conversion to decibels may be performed, such as by accessing a mathematical table. If the readout is not linear, a calibration curve may be obtained to enable conversion to fade margin.

The system of the present invention may also be utilized in a voice communications mode. In this case, one of the technicians at a communication station, such as the aimer, may be the calling technician; the other technician may be the listening technician. The calling technician may speak into microphone 38, which transduces speech into an electrical audio signal and amplifies said signal at audio voltage amplifier 36. The amplified signal is applied to pulse width modulator 20 via switching unit 32. Pulse width modulator 20 modulates the signal received from audio voltage amplifier 36 with a test signal received from test signal generator 18 and applies the modulated signal to transmitter 14, for transmission to the station of the listening technician. At the station of the listening technician, the signal transmitted by the transmitter of the calling technician is received by receiver 12 and is fed to lowpass filter 26. The signal filtered at lowpass filter 26 is amplified at audio amplifier 28 and fed to loudspeaker 30, which transduces the signal into a speech signal heard by the listening technician. The same procedure is applicable when the roles of the calling technician and the listening technician are reversed.

Loudspeaker 30 may also be used as a microphone, or microphone 38 may be used as a loudspeaker. In the case where only one of either loudspeaker 30 or microphone 38 is employed, only half duplex communication may be established between the two technicians, and a push-to-talk (PTT) switch (not shown) is required at each site. If both loudspeaker 30 and microphone 38 are employed, a full duplex communication may be established between the two technicians. In that case, each technician may use a headset unit (not shown) for voice communication, in order to avoid audio oscillation due to feedback.

In the system of the present invention, a normal data communication mode may be selected by operating selector 33. In that case, data from a data source (not shown) at a first station is provided to transmitter 14 via selector 33 and transmitted to a second station. At the second station, the data is received at receiver 12 and applied to a network interface unit (not shown). It is to be appreciated that the roles of the first station and the second station may be reversed.

The alignment mode, as well as the voice communications mode described above, includes audio feedback. The system of the present invention may also be operable in a remote switching mode, in which an operating mode of the multi-mode communication system may be remotely selected. The remote switching mode allows a single technician at the aiming station to achieve alignment without requiring a second technician to switch between the operating modes of the remote station. In the remote switching mode, the technician at the aiming station selects a mode of operation, such as a normal data communication mode, whereupon selector 33, at each station, enables transfer of data from a data source (not shown), and receiver 12 at each station transfers received data to a network interface unit (not shown).

If the mode of operation is one of the voice feedback modes, selector 33 controls the operation of switching unit 32 to enable connection only to units required for that mode of operation. Thus, upon the selection of the mode of operation at a transmitting station such as the aiming station, mode signalling oscillator 34 provides a signal uniquely associated with that selection, which in turn is applied to pulse width modulator 20. Preferably, the signal associated with the selection of the operation mode is a tone signal such as a dual tone multifrequency (DTMF) telephony signal.

Pulse width modulator 20 modulates the signal associated with the selection of the mode of operation over a carrier test signal generated by test signal generator 18, to operate optical transmitter 14. At the receiving station, which may be the remote station, the signals received by receiver 14 are applied to detector 16, providing a DC voltage signal output which is substantially proportional to the amplitude of the signal received by the optical receiver of the remote station.

The output of detector 16 is applied to mode signalling detector 22, providing a signal indicating the selection of the operation mode at the aiming station. The remote station then responds in accordance with the selected operation mode.

The modulation in the system of the present invention need not be pulse width modulation. Other modulation techniques, such as pulse position modulation (PPM) or pulse amplitude modulation (PAM), may be applicable in all the above-mentioned modes of operation of the system. In such a case, pulse width modulator 20 may be replaced with a pulse position modulator or a pulse amplitude modulator.

The system may also include a default mode such that, after a time-out period, the system automatically passes to the default mode. This may be achieved by programming a processor (not shown) which controls selector 33.

It will be evident to those skilled in the art that the invention is not limited to the details of the foregoing illustrated embodiments and that the present invention may be embodied in other specific forms without departing from the spirit or essential attributes thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed is:

1. A system for communicating a signal representing the amplitude of a sound signal received at a remotely located transceiver via an optical airlink communication network, said system comprising:
   an optical transceiver, including an optical receiver and an optical ON/OFF keyed transmitter;
   a detector coupled to said optical receiver for providing a DC voltage signal output which is substantially proportional to the amplitude of the signal received at said optical receiver;
   a voltage controlled audio oscillator coupled to said detector for providing an audio output signal of a frequency proportional to the DC voltage signal provided by said detector;
   a test signal generator for generating a carrier test signal; and
   a pulse width modulator coupled to said test signal generator, to said voltage controlled audio oscillator, and to said optical transmitter, wherein said pulse width modulator modulates said audio output signal over said carrier test signal to control generation of ON/OFF keyed optical signals by said optical transmitter.

2. The system according to claim 1, further comprising:
   a lowpass filter coupled to said optical receiver for separating an audio signal from a carrier signal and for eliminating said carrier signal;
   an audio amplifier for amplifying said audio signal; and
   a loudspeaker for producing a sound signal in accordance with the amplified audio signal applied thereto.

3. The system according to claim 1, wherein said carrier test signal is a 1 MHz square wave signal.

4. The system according to claim 2, wherein said sound signal is indicative of the strength of the signal received at a remote communication station.

5. The system according to claim 4, wherein the indication of the strength of the signal received at said remote communication station is employed to align optical transceivers in said optical airlink communication network.

6. A system for communicating voice over an optical airlink communication network, said system comprising:
   a microphone for generating an electrical audio signal representative of speech;
   an audio voltage amplifier coupled to said microphone, for amplifying said audio signal;
   a test signal generator for generating a carrier test signal;
   an optical transceiver including an optical receiver and an optical ON/OFF keyed transmitter; and
   a pulse width modulator coupled to said test signal generator, to said audio voltage amplifier, and to said optical transmitter, wherein said pulse width modulator modulates said amplified audio signal over said carrier test signal, to control generation of ON/OFF keyed optical signals by said optical transmitter.

7. The system according to claim 6, further comprising:
   a lowpass filter coupled to said optical receiver for separating an audio signal from a carrier signal and for eliminating said carrier signal;
   an audio amplifier for amplifying said audio signal; and
   a loudspeaker for producing a sound signal in accordance with the amplified audio signal applied thereto.

8. A multi-mode communication system for providing data communications and audio feedback communications, said system comprising:
   a selector for selecting a mode of operation;
   a switching unit coupled to said selector for switching to said selected mode of operation;
   a mode signalling oscillator for providing a signal uniquely associated with the selection of said mode of operation;
   an optical transceiver including an optical receiver and an optical ON/OFF keyed transmitter;
   a test signal generator for generating a carrier test signal; and
   a pulse width modulator coupled to said test signal generator, to said switching unit, and to said optical transmitter, for modulating said signal associated with the selection of said mode of operation over said carrier test signal, to control generation of ON/OFF keyed optical signals by said optical transmitter.

9. The system according to claim 8, comprising:
   a detector coupled to said optical receiver for providing a DC voltage signal output which is substantially proportional to the amplitude of the signal received at said optical receiver; and
   a mode signalling detector coupled to said detector and to said switching unit, for providing a signal indicating the selection of said mode of operation.

10. A multi-mode communication system for providing data communications and audio feedback communications, said system comprising:
    an optical transceiver, including an optical receiver and an optical ON/OFF keyed transmitter;
    a detector coupled to said optical receiver for providing a DC voltage signal output which is substantially proportional to the amplitude of the signal received at said optical receiver;

a voltage controlled audio oscillator coupled to said detector for providing an audio output signal of a frequency proportional to the DC voltage signal provided by said detector;

a lowpass filter coupled to said detector for separating a received audio signal from a carrier signal and for eliminating said carrier signal;

an audio amplifier coupled to said lowpass filter for amplifying said received audio signal;

a loudspeaker coupled to said audio amplifier, for producing a speech signal in accordance with the amplified received audio signal;

a selector for selecting a mode of operation;

a mode signalling detector coupled to said detector, for providing a signal indicating the selected mode of operation;

a mode signalling oscillator for providing a signal associated with said signal indicating the selected mode of operation;

a microphone for generating an audio signal representative of speech;

an audio voltage amplifier coupled to said microphone, for amplifying said audio signal;

a switching unit coupled to said mode signalling detector, to said voltage controlled audio oscillator, to said mode signalling oscillator, to said selector and to said audio voltage amplifier, for switching between available modes of operation;

a test signal generator for generating a carrier test signal; and a pulse width modulator coupled to said test signal generator, to said switching unit, and to said optical transmitter, wherein said pulse width modulator modulates the pulse width of said signal provided via said switching unit in accordance with said selected mode of operation, over said carrier test signal, to control generation of ON/OFF keyed optical signals by said optical transmitter.

11. A system for communicating a sound signal via an optical airlink communication network, said system comprising:

an optical transceiver, including an optical receiver and an optical ON/OFF keyed transmitter;

a detector coupled to said optical receiver for providing a DC voltage signal output which is substantially proportional to the amplitude of the signal received at said optical receiver;

a test signal generator for generating a carrier test signal; and a pulse width modulator coupled to said test signal generator and to said optical transmitter for modulating said DC voltage signal output over said carrier test signal, to control generation of ON/OFF keyed optical signals by said optical transmitter.

12. A method for communicating a sound signal via an optical airlink communication network, said method comprising:

locating an aiming station at which alignment operations are performed at a distance from a remote station, at a range which is acceptable for over-the-air optical communications;

providing, at each of said stations, an optical transceiver including an optical receiver and an optical ON/OFF keyed transmitter;

transmitting a test signal from said aiming station to said remote station;

receiving said test signal at a receiver at said remote station;

providing an audio frequency output signal in response to said received test signal;

generating a carrier test signal at said remote station;

modulating said audio frequency output signal in accordance with a pulse width modulation scheme over said carrier test signal, to control generation of ON/OFF keyed signals by the optical transmitter in said remote station; and transmitting said ON/OFF keyed optical signals.

13. The method according to claim 12, further comprising:

receiving, at said aiming station, a signal transmitted by said transmitter at said remote station;

separating an audio signal from a carrier signal in said received signal and eliminating said carrier signal;

amplifying said audio signal; and transducing said amplified audio signal to a sound signal.

14. A method for communicating voice over an optical airlink communication network, said method comprising:

converting a speech signal to an electrical audio signal representative of said speech signal;

amplifying said electrical audio signal to provide an amplified audio signal;

generating a carrier test signal;

providing an optical transceiver including an optical receiver and an optical ON/OFF keyed transmitter;

modulating said amplified audio signal over said carrier test signal in accordance with a pulse width modulation scheme, to control generation of ON/OFF keyed signals by said optical transmitter; and transmitting said ON/OFF keyed optical signals.

15. The method according to claim 14, further comprising:

receiving an input signal;

separating an input audio signal from a carrier signal in said received input signal and eliminating said carrier signal;

amplifying said input audio signal; and transducing said amplified input audio signal to a speech signal.

16. A method for providing data communications and audio feedback communications in a multi-mode communication system, said method comprising:

switching to a selected mode of operation;

generating a signal indicative of the selection of said mode of operation;

providing an optical transceiver including an optical receiver and an optical ON/OFF keyed transmitter;

producing a carrier test signal;

modulating said signal indicative of the selection of said mode of operation over said carrier test signal, to control generation of ON/OFF keyed optical signals by said optical transmitter; and transmitting said ON/OFF keyed signals.

17. The method according to claim 16, further comprising:

receiving an input signal at said optical receiver; and generating a signal indicative of said selection of a mode of operation.

18. The method according to any one of claims 12–17, further comprising:

normalizing a readout signal received at said optical receiver, to a receiver threshold level, for obtaining an indication of a fade margin of said transceiver.

* * * * *